(12) United States Patent
Zimmer (10) Patent No.: US 6,513,186 B1
(45) Date of Patent: Feb. 4, 2003

(54) WIPER SYSTEM

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/381,776

(22) PCT Filed: Jan. 21, 1999

(86) PCT No.: PCT/DE99/00141

§ 371 (c)(1),
(2), (4) Date: Dec. 23, 1998

(87) PCT Pub. No.: WO99/38736

PCT Pub. Date: Aug. 5, 1999

(30) Foreign Application Priority Data

Jan. 29, 1998 (DE) .......................... 198 03 344

(51) Int. Cl.⁷ ................ B60S 1/06; B60S 1/24
(52) U.S. Cl. ......... 15/250.31; 15/250.3; 403/DIG. 3; 296/96.15
(58) Field of Search .......... 15/250.3, 250.31, 15/250.34, 250.27; 296/96.17, 96.15; 403/DIG. 3, 2; 74/42, 43

(56) References Cited

U.S. PATENT DOCUMENTS

| 3,790,985 | A | * | 2/1974 | Kessler .................. 15/250.34 |
| 5,203,049 | A | * | 4/1993 | Nogawa ................. 15/250.34 |
| 5,337,439 | A | * | 8/1994 | Frey et al. ............... 15/250.31 |
| 5,735,171 | A | * | 4/1998 | Moote et al. ............ 15/250.34 |
| 6,138,320 | A | * | 10/2000 | Komo .................... 15/250.31 |

FOREIGN PATENT DOCUMENTS

| DE | 2304.806 | * | 8/1974 | .............. 15/250.34 |
| EP | 739792 | * | 10/1996 | |
| EP | 806329 | * | 11/1997 | |

* cited by examiner

Primary Examiner—Gary K. Graham
(74) Attorney, Agent, or Firm—Michael J. Striker (57) ABSTRACT

The invention is based on a wiper installation, having at least one wiper bearing (10), in whose hearing housing (12,126) a wiper shaft (18) is supported and axial fixed, and which on its end (20) protruding from a vehicle body (24) carries a wiper arm (60). The wiper shaft (18) is displaceable into the vehicle body (24) when an axial force (40) that exceeds a predetermined magnitude is exerted from outside on the end (20).

11 Claims, 10 Drawing Sheets

WIPER SYSTEM

BACKGROUND OF THE INVENTION

Known window wipers have a wiper arm, which is constructed of a fastening part and a joint part, pivotably connected to it, with a wiper rod. They also have a wiper blade, which is constructed of a support bracket system with a predominant center bracket and pivotably connected, subordinate intermediate brackets as well as claw brackets and a wiper strip. The wiper blade is pivotably connected to the wiper arm, in that a free end of the wiper rod holds a bearing part that is disposed between two side cheeks of the center bracket and that includes a hub that is open over a circumferential region and a pivot bolt of the center bracket. The joint thus formed guides the wiper blade over the window during the pivoting motion; the joint and the support bracket system allow the wiper strip to adapt to adapt to any curvature of the window.

The fastening part of the wiper arm is seated on the free end of a wiper shaft, which is supported in a wiper bearing and is driven by a wiper motor via a crank and a rod linkage. The wiper motor is held by a mounting bracket, which is fastened to a vehicle body and includes the wiper bearing. Often, the wiper bearings themselves act as fastening points, by protruding through openings in the vehicle body and being screwed to the vehicle body with the interposition of vibration-damping rubber-elastic elements. However, it is also possible for them to be connected to the vehicle body via props on the mounting bracket.

The end of the wiper shaft protruding from the vehicle body is a possible cause of injury in the event of accidents involving pedestrians. Proposals for crash regulations by the European Commission (EC III/5021/96 EN), with regard to accidents involving pedestrians, define maximum acceleration values, or so-called head injury criteria, in the region of the vehicle hood at the wiper installation. These criteria can not be met with the conventional wiper installations, even if the vehicle hood covers the wiper shaft, since even in this case, it is still not assured that the spacing between the vehicle hood and the wiper shaft will be large enough, especially when hood gaps are small.

SUMMARY OF THE INVENTION

According to the invention, the wiper shaft is displaceable into the vehicle body when an axial force that exceeds a predetermined magnitude is exerted from outside on the end. As a result, on the one hand, the prescribed criteria can be met; on the other, the wiper shaft can be prevented from being displaced by lesser axial forces, for instance if the wiper arm becomes blocked by snow or for other reasons.

Expediently, a defined displacement distance is specified for the wiper shaft. It must be assured here that the displacement distance can be fully utilized, in that the spacing have the wiper arm from the vehicle body or from the windshield, and the spacing of the inner end of the wiper shaft, or of a part solidly connected to it, from an adjacent vehicle part, corresponds at least to the displacement distance. The fastening part of the wiper arm, in the region of its fastening to the wiper shaft, has a large-area cover cap of solid material, in order to reduce the pressure per unit of surface area in the event of an impact on the protruding end of the wiper shaft, and thus to lessen the risk that the end of the wiper shaft will penetrate a person's body. It is also advantageous that the impact energy is largely dissipated over the displacement distance, because the motion of the wiper shaft is damped to an increased extent over the displacement distance and in particular toward the end of the displacement distance.

For damping the impact, means that deform plastically and/or elastically in the axial direction under the influence of a critical axial force are provided between an inward-acting stop of the wiper shaft and a part solidly connected to the vehicle body, or between such a part in the vehicle body. Such means may be a plastically deformable sheet-metal sheath, which expediently has an axially corrugated region, or they may be thin-walled plate-like elements, which depending on the displacement distance can be disposed multiply, operatively in series. These elements may have so little play from the wiper shaft or other adjacent components that upon their deformation may press against these components and by friction amplify the damping action. Finally, the means can be disposed such that under the influence of the critical axial force, they are upset or pulled apart.

The wiper shaft can be axially secured to the bearing housing of the wiper bearing via positive engagement elements with a rated breaking point, which in response to a critical axial force either break or bend over into a free space. Such rated breaking points can be produced by means of notches, bores, or shearing pins.

In a further feature, the wiper shaft is supported axially inward via an element nonpositively connected to the bearing housing, with the nonpositive engagement dimensioned such that it yields under the influence of a critical axial force. The nonpositive engagement element can be a bushing which is inserted into the bearing housing with a press fit. A bearing bush can expediently be used for the purpose.

A further advantage is that the means are mounted at different points, acting in series. Thus first means can be provided between the wiper shaft and an element, such as a bearing bush, guided in the bearing housing; second means can be provided between that element and the bearing housing; third means can be provided between the bearing housing and the vehicle body or the mounting bracket; and fourth means can be provided between the mounting bracket and the vehicle body.

As a result, on the one hand a long displacement distance with high energy consumption can be attained; on the other, the means can be adapted to one another in such a way that with an increasing critical axial force, they become operative in succession, so that depending on the severity of the accident, only some of the means have to be replaced.

BRIEF DESCRIPTION OF THE DRAWINGS

Further advantages will become apparent from the ensuing description of the drawings. In the drawings, a wiper installation and exemplary embodiments of the invention are shown, to the extent necessary for comprehension of the invention. The drawing, specification and claims include numerous characteristics in combination. One skilled in the art will expediently consider the characteristics as well and combine them into suitable further combinations.

Shown are.

DESCRIPTION OF THE PREFERRED EMBODIMENTS

Figure 1:
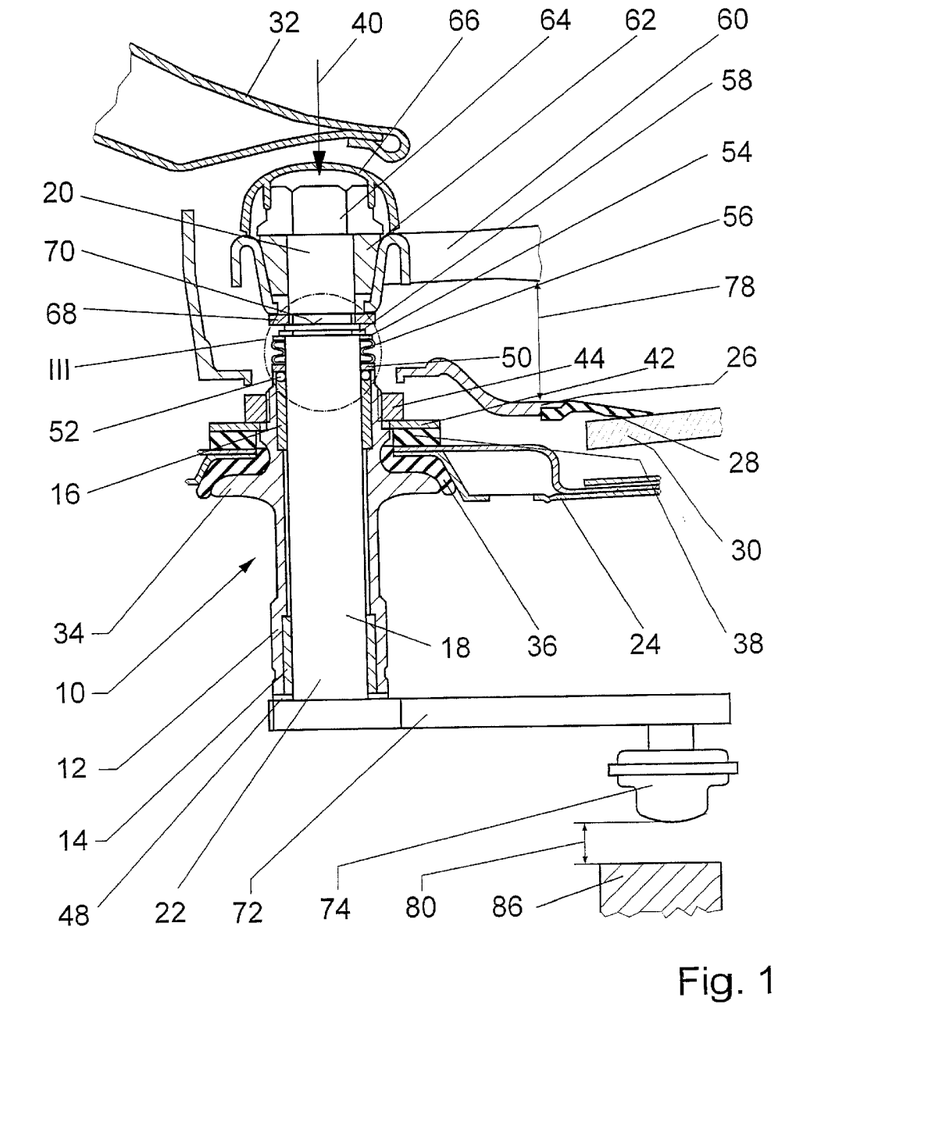
FIG. 1, a schematic section through a wiper bearing, whose end is covered by a vehicle hood.
Figure 18:
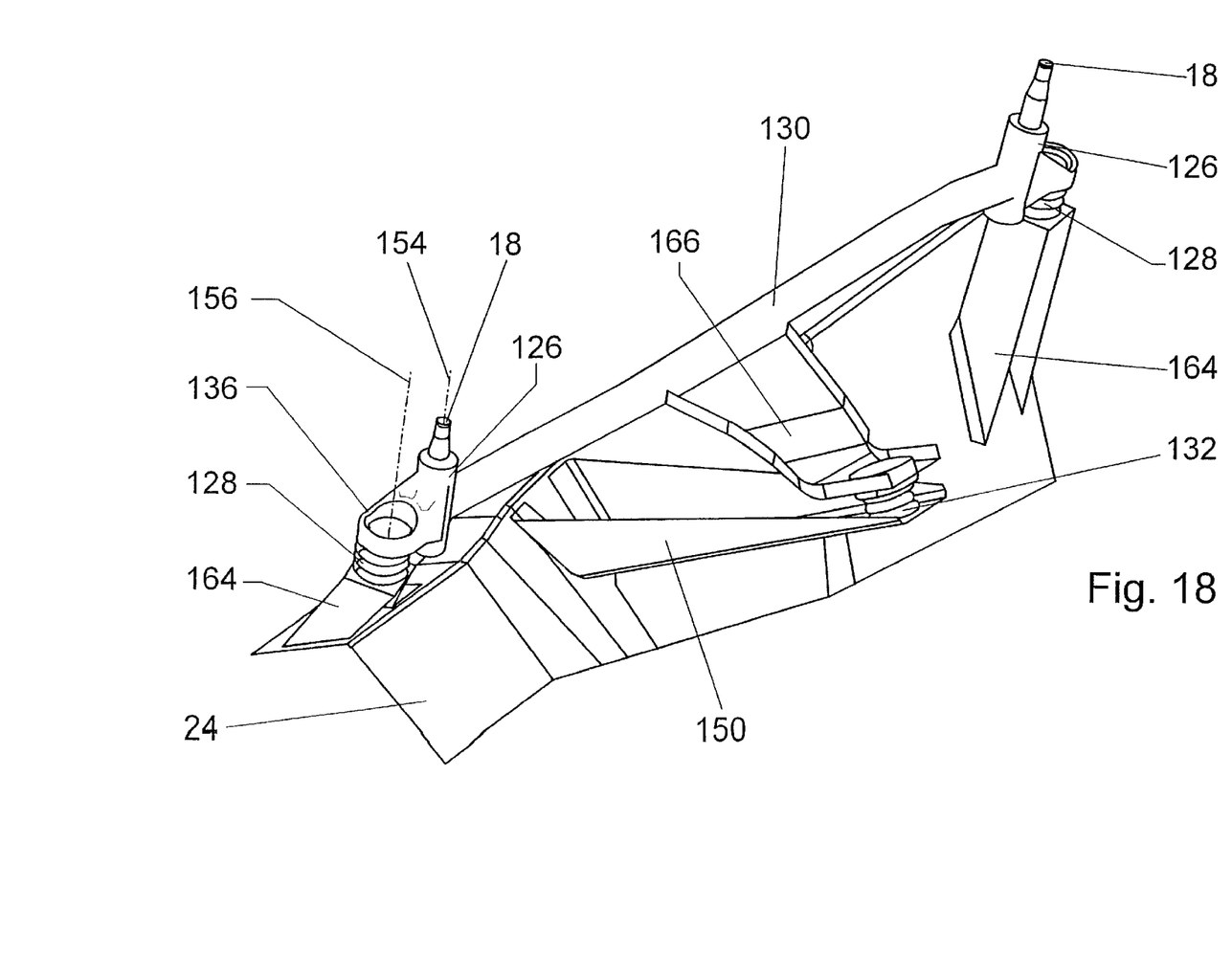
FIG. 18, a perspective view of a mounting bracket with wiper bearings.

A wiper bearing 10, whose bearing housing 12, 126 is a component of a mounting bracket 130 (FIG. 18) for fastening the wiper installation to a vehicle body 24, includes a wiper shaft 18, which is supported in the bearing housing 12 via two bearing bushes 14, 16 (FIG. 1). The bearing housing 12 is inserted by one end through an opening in the vehicle body 24 and, with the interposition of rubber-elastic vibration-damping elements 36 and 38, is screwed by a flange 34 and a shim 42 to the vehicle body 24 by means of a nut 44. The space between the vehicle body 24 and a vehicle hood 32, which can extend across the wiper bearing 10, is bounded by a cover 26, which presses with a disk seal 28 against a windshield 30. The wiper shaft 18 is driven via a rod linkage, not shown, by a wiper motor, also not shown, via a crank 72 with a joint head 74. A stop disk 48, which represents an axial fixation of the wiper shaft 18 on its inner end 22, is located between the crank 72 and the inner face end of the bearing housing 12. On its outer end 20, the wiper shaft 18 is supported axially, via a stop disk 50, a sheet-metal sheath 56, a shim 54, and a securing ring 58, on the bearing housing 12 that is solidly joined to the vehicle body 24. On the face end, the bearing housing 12 protrudes past the bearing bush 16 and together with the wiper shaft 18 and the stop disk 50 forms an annular chamber in which a sealing ring 52 is placed. Secured to the outer end 20 of the wiper shaft 18 is a fastening part 60 of a wiper arm; via a clamping cone 62, a nut 64 presses the fastening part 60 against a support ring 68, which is supported on a shoulder 70 of the wiper shaft 18. Toward the outside, the nut 64 carries a large-area cover cap 66, for reducing the pressure per unit of surface area in the event of a collision.

Figure 3:
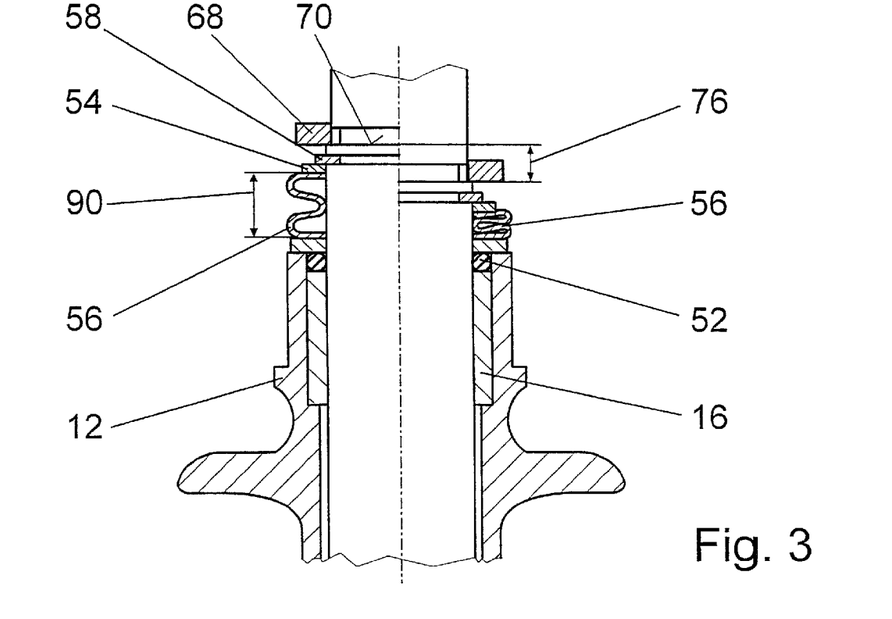
FIG. 3, a detail marked III in FIG. 3, with the right half of FIG. 3 showing the arrangement after a crash.

If a collision occurs, an axial force 40 acts on the wiper shaft 18. If this forces exceeds a predetermined critical amount, the sheet-metal sheath 56 is compressed, and the wiper shaft 18 displaces inward by a displacement distance 76 (FIG. 3). Because of the deformability of the sheet-metal sheath 56, the motion of the wiper shaft 18 is damped, and the impact energy is dissipated. The deformation work to be performed can be modified by varying the design of a corrugated region 90 of the sheet-metal sheath 56. The play between the sheet-metal sheath 56 and the wiper shaft 18 can also be dimensioned such that upon deformation, the sheet-metal sheath 56 presses against the wiper shaft 18, so that by friction, the damping rises with an increasing displacement distance. If the displacement distance 76 is to be fully utilized, the spacing between the fastening part 60 of the wiper arm and the vehicle body 24, or the cover 26 or the windshield 30 and the spacing 80 between the joint head 74 and an adjacent vehicle part 86 must correspond at least to the displacement distance 76.

Figure 2:
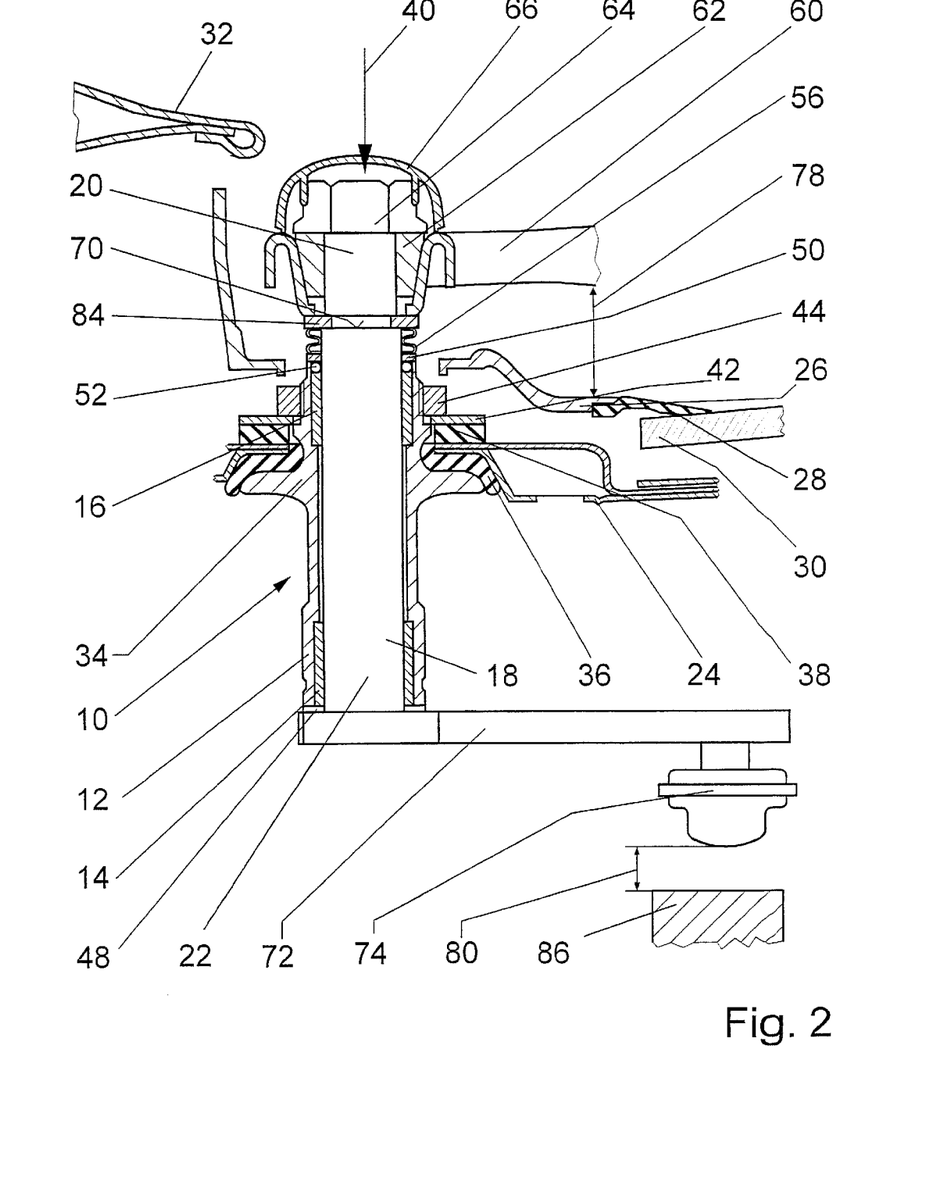
FIG. 2, a variant of FIG. 1 with a free-standing wiper bearing.

FIG. 2 shows a version with a wiper bearing 10 that is not covered on the outside by the vehicle hood 32. An intermediate ring 84 is also provided on the outer end 20 of the wiper shaft 18, and the sheet-metal sheath 56 on one side and the fastening part 60 on the other are supported on this ring. This economizes on axial structural length, so that with otherwise identical given conditions, a longer displacement distance 76 is possible.

Figure 4:
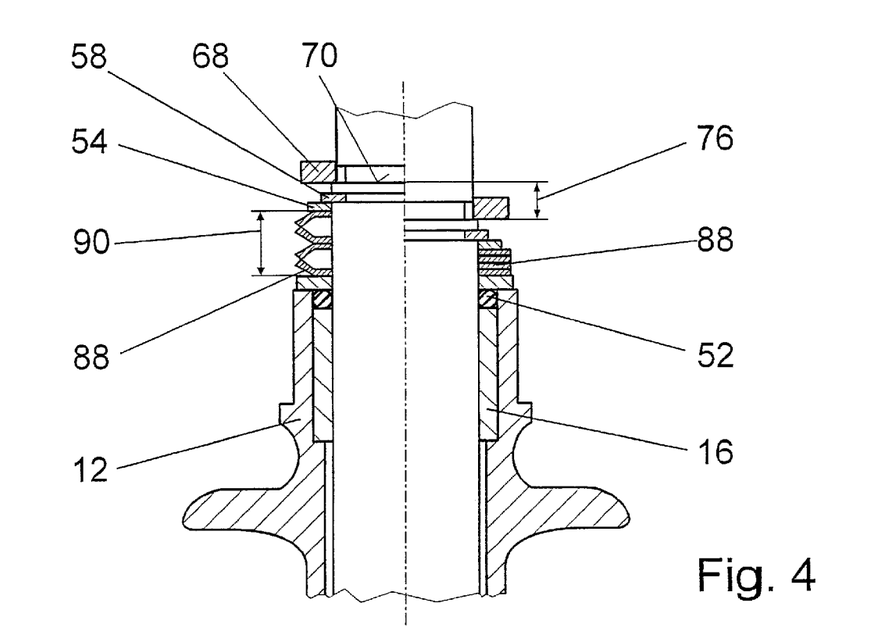
FIG. 4, a variant of FIG. 3.

In the version of FIG. 4, instead of the sheet-metal sheath 56, thin-walled plate-like elements 88 are provided, which are operatively disposed in series and are pressed flat (shown on the right in FIG. 4) under the influence of a critical axial force 40.

Figure 5:
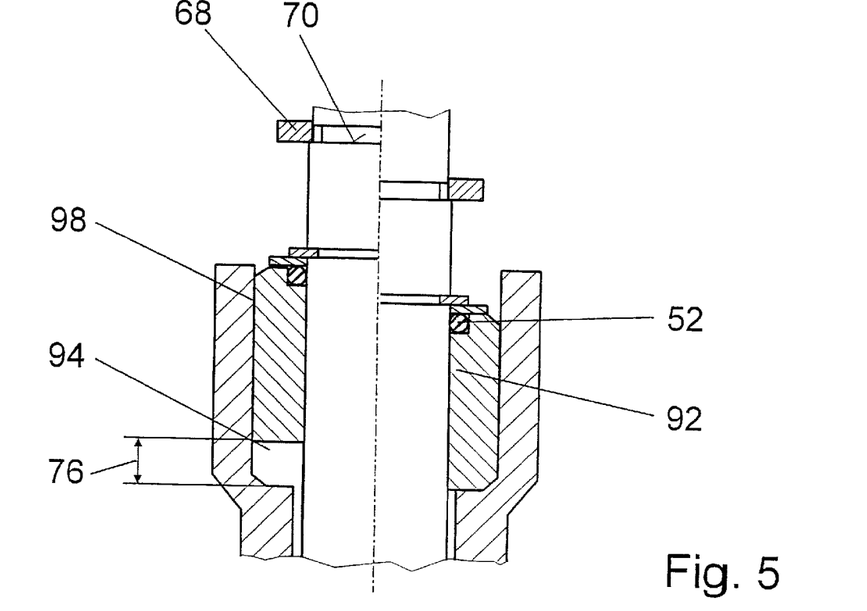
FIG. 5, a detail corresponding to FIG. 3 with a nonpositive engagement element.
Figure 6:
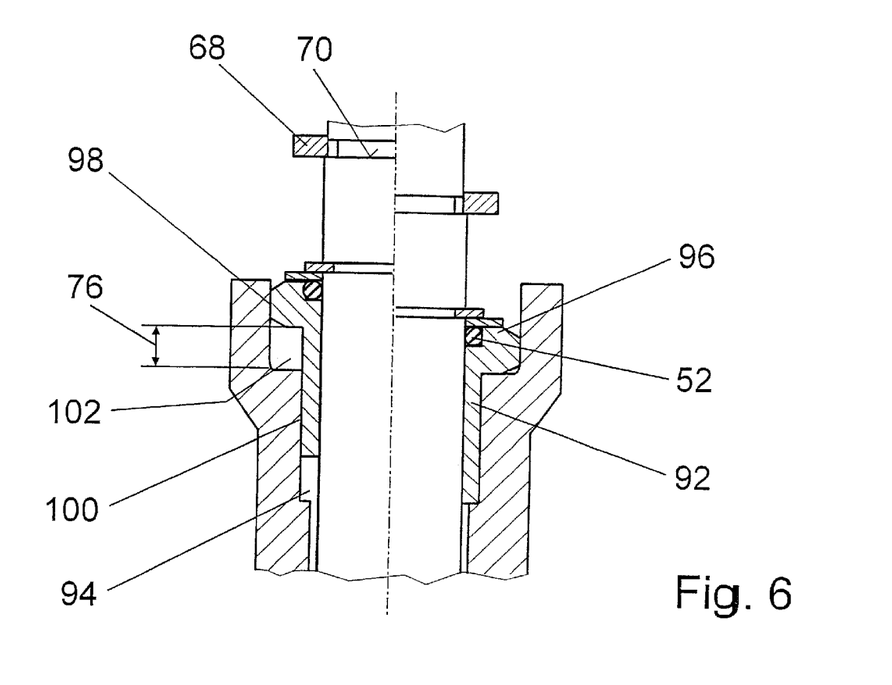
FIG. 6, a variant of FIG. 5.

In the version of FIG. 5, the wiper shaft 18 is supported on its face end, via the shim 54, on a nonpositive engagement element 92, which at the same time serves as a bearing bush and is inserted with a press fit 98 into the bearing housing 12. On the interface end of the nonpositive engagement element 92, a free space 94 is provided, which permits a displacement travel 76 if the critical axial force 40 overcomes the press fit 98. The version of FIG. 6 differs from the version of FIG. 5 in that the nonpositive engagement element 92 is embodied with thinner walls and on its outer end has a collar 96, which is adjoined toward the inside by a free space 102. The nonpositive engagement element 92 is retained in the bearing housing 12 via a press fit 100 and optionally a further press fit 98; the free spaces 94 and 102 permit a displacement travel 76 when the critical axial force 40 overcomes the press fits 98 and 100 (right-hand half of FIG. 5).

Figure 7:
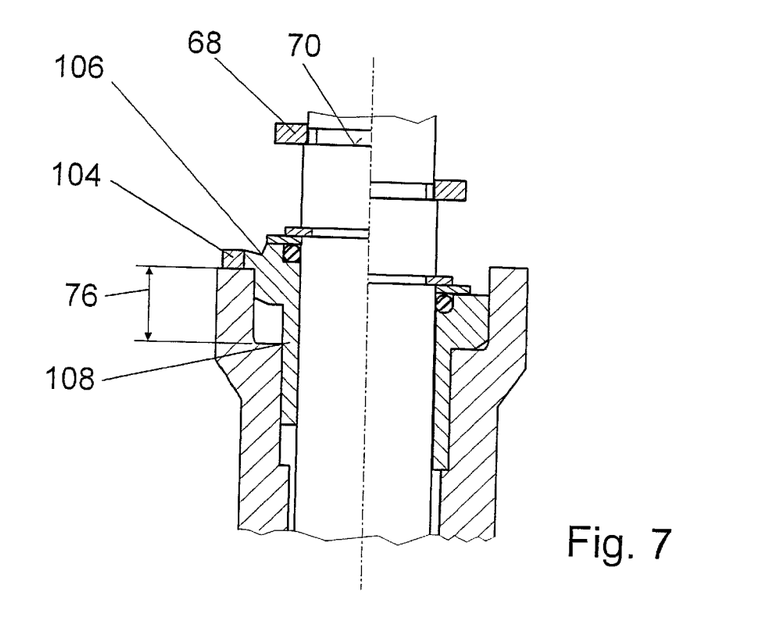
FIG. 7, a detail of FIG. 3 with a positive engagement element with a rated breaking point.

In the version of FIG. 7, a bush 108, which at the same time can be a bearing bush for the wiper shaft 18, is provided on the outer end 20. This bush is supported in the bush 108 on the bearing housing 12 via the shim 54 and an edge 104. Between the edge 104 and the inner part of the bush 108, a rated breaking point in the form of a notch 106 is provided, so that upon a critical axial force 40, the edge 104 breaks off, and the bush 108, by utilizing the free spaces 94 and 102, can be displaced inward (right half of FIG. 7) by the displacement distance 76, along with the wiper shaft 18.

Figure 8:
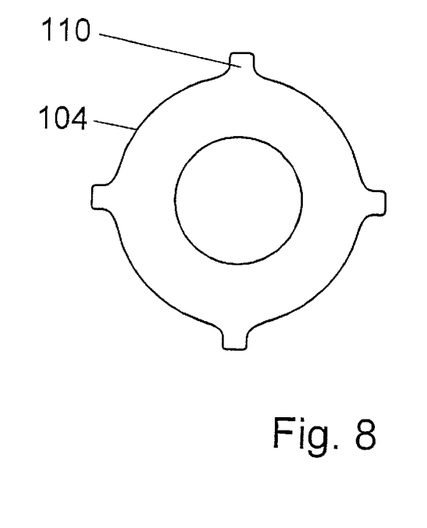
FIGS. 8 through 10, a variant of FIG. 7.
Figure 9:
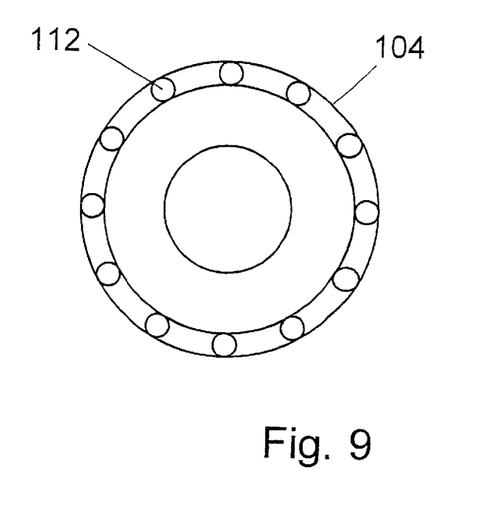
Figure 10:
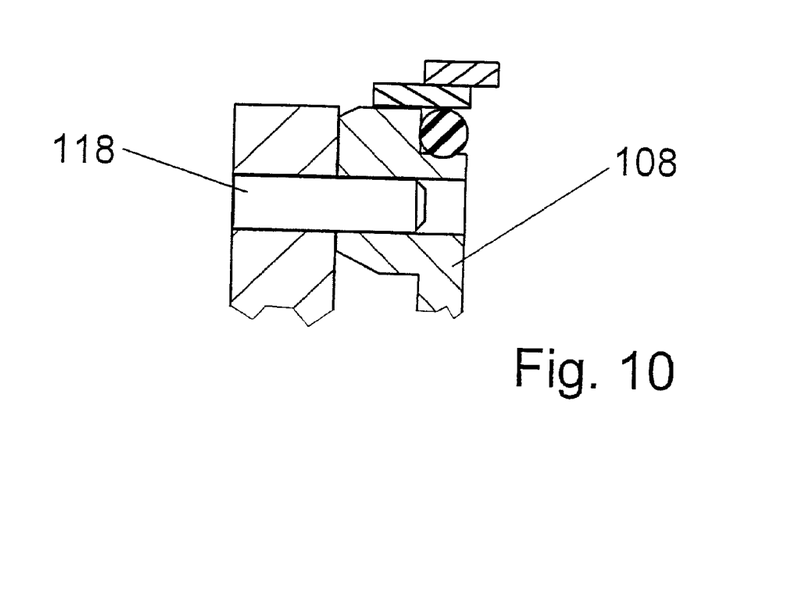

FIGS. 8, 9 and 10 show possible designs of the rated breaking point. In the version of FIG. 8, the edge 104 (FIG. 7) is relieved and is formed by individual radially oriented tongues 110 distributed over the circumference. In the version of FIG. 8 the edge 104 includes numerous bores 112, which determine the rated breaking load. Finally, in the version of FIG. 10, the bush 108 is joined to the bearing housing 12 via shearing pins 118, which are sheared off if there is an overload.

Figure 11:
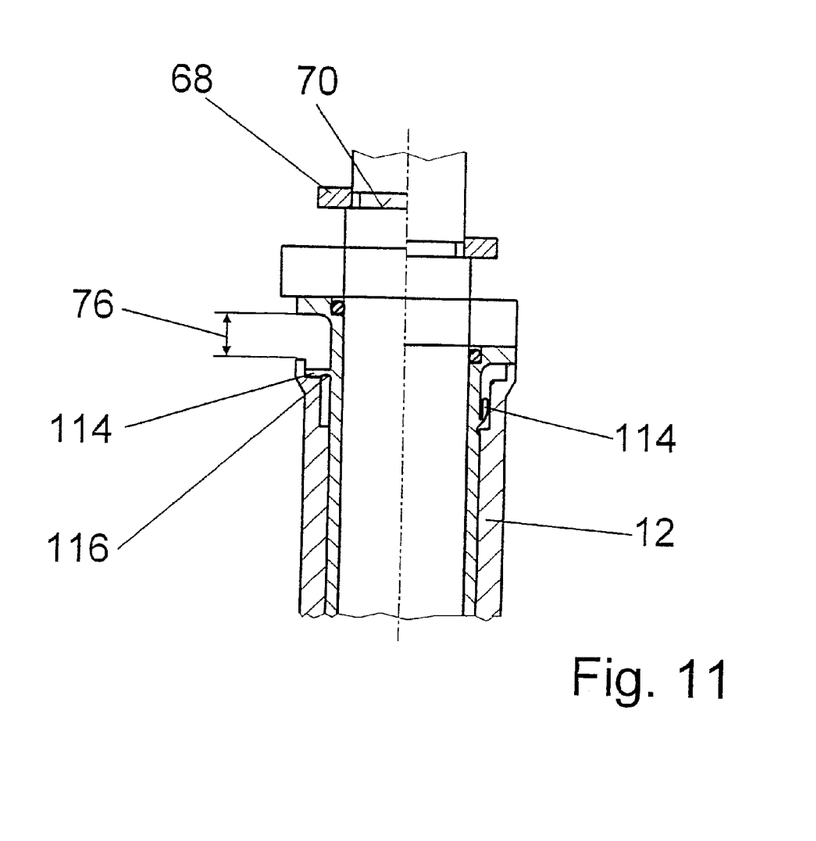
FIG. 11, a variant of FIG. 7 with bending elements.

The version of FIG. 11 differs from the versions of FIGS. 7 through 10 in that the edge 104 is formed by tabs 114, which under a critical axial force 40 bend at a bending point 116 and are pressed into the free space 94. Here, the ball friction and damping over the displacement distance 76 are increased.

Figure 12:
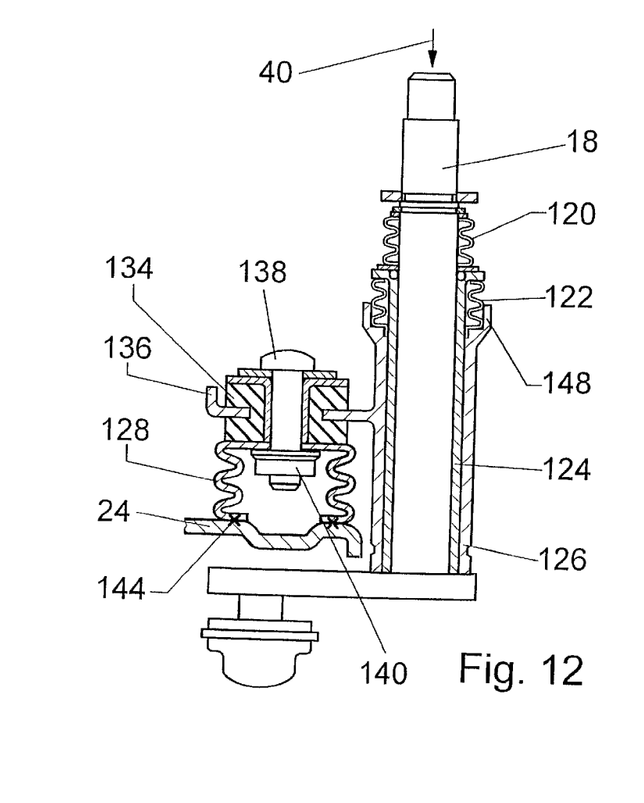
FIG. 12, a variant if FIG. 3 with first, second and third plastically and/or elastically deformable means, in the outset state.
Figure 13:
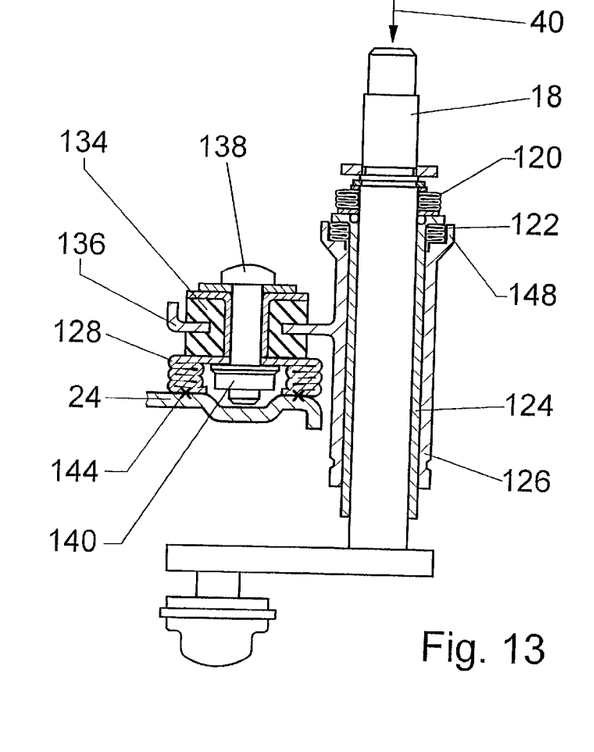
FIG. 13, the embodiment of FIG. 12 in the state after a severe crash.

The version of FIGS. 12 and 13 shows a wiper shaft 18, which is supported on a bearing element 124 via a first means 120, in the form of a corrugated sheet-metal sheath, that is plastically deformable and to a slight extent elastically deformable. This sheath is supported in turn relative to a bearing housing 126 via second, plastically deformable means 122. The bearing housing 126 has a bearing eyelet 136, in which a rubber damper 134 is inserted in order to prevent noise from being transmitted to the vehicle body. The rubber damper 134 is secured, by means of a screw 138 and a shim 146, to a third plastically deformable means 128, in the form of a corrugated sheet-metal sheath, by way of which the bearing housing 126 is supported relative to the vehicle housing 24.

If in a crash the critical axial force 40 exceeds a specified amount, the first means 120, second means 122 and third means 128 are deformed, producing a maximum displacement distance for the wiper shaft 18. In principle, it is also possible for the bearing housing 126 to be supported via the third means 128 relative to a mounting bracket 130 (FIG. 18), which in turn is supported relative to the vehicle body 24 via fourth plastically deformable means 132. As needed, the means 120, 122, 128 and 132 can be used individually or several can be used together, and as a result the displacement distance and the amount of deformation energy can be adapted to the particular application. It may be expedient for the means 120, 122, 128, 132 to be adapted to one another in such a way that with an increasing axial force 40, they come into action successively, so that in the event of minor accidents, only the means that become active first have to be replaced. The deformation work can be reinforced by friction work, in that the means 120, 122, during the deformation, press against the wiper shaft 18, or the bearing element 124, or a wall 148 of the bearing housing 126.

Figure 14:
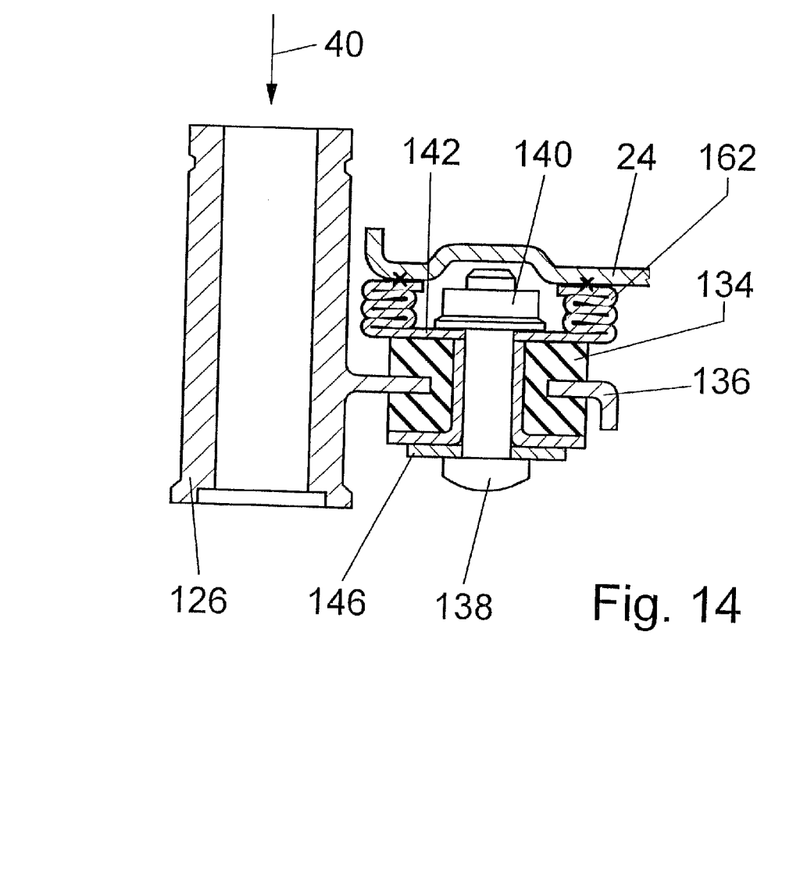
FIG. 14, an arrangement with a deformation element in the outset state, which pulls apart in the crash.
Figure 15:
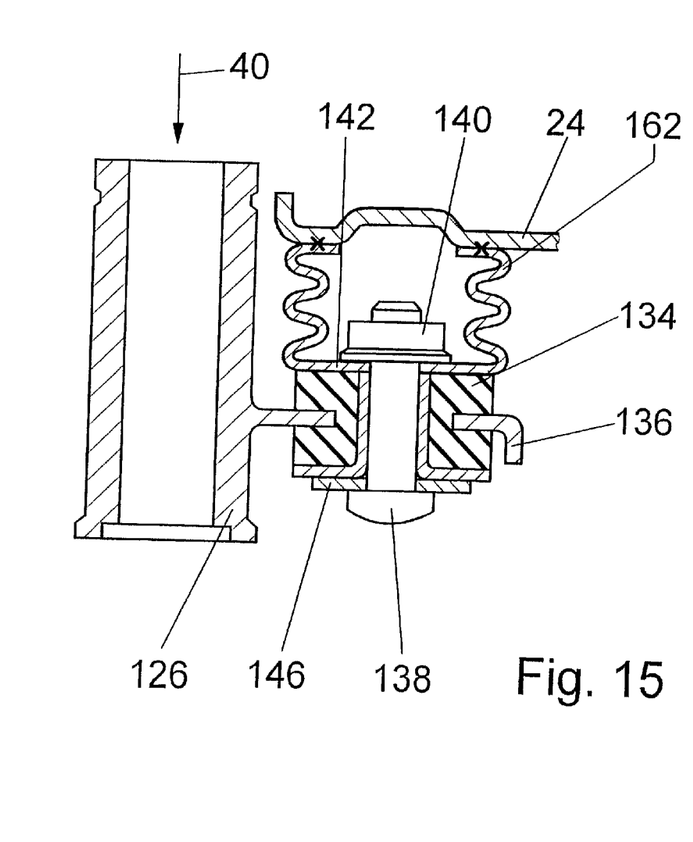
FIG. 15, an arrangement of FIG. 14 after a crash.
Figure 16:
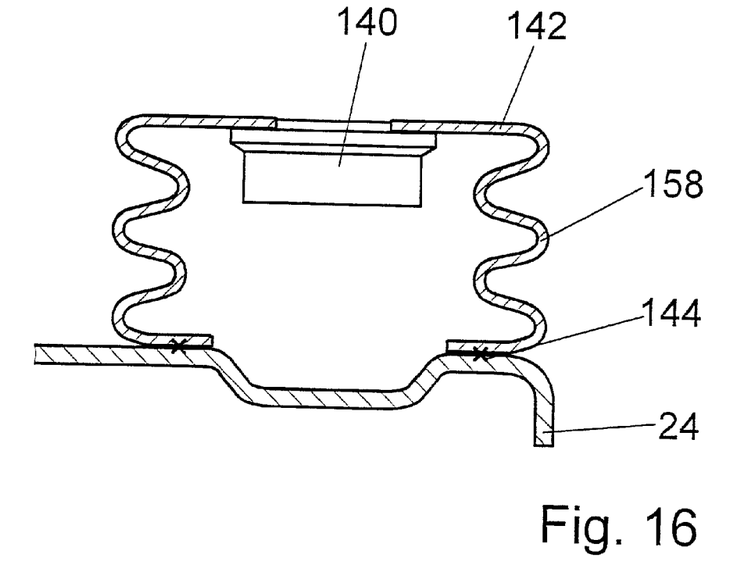
FIG. 16, a section through a deformation element with a welded nut.
Figure 17:
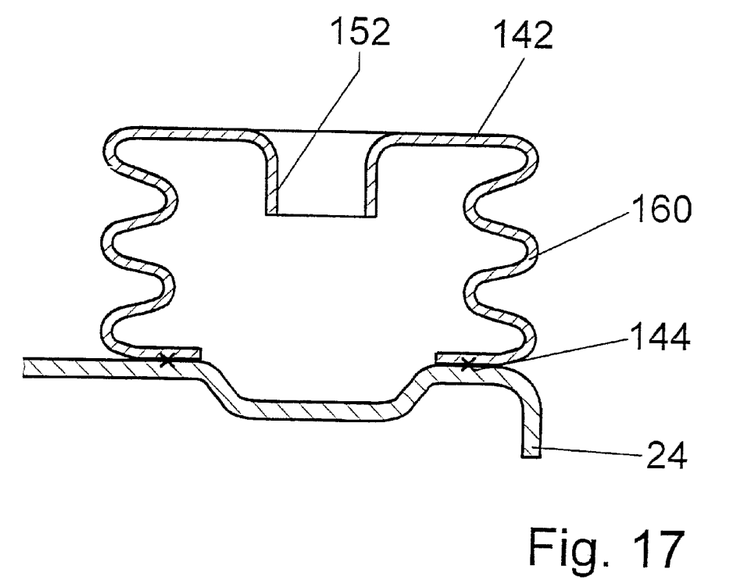
FIG. 17, a section through a deformation element with an integrally molded lead through for a self-tapping screw.

Instead of or in combination with the corrugated sheet-metal sheaths, the above-described provisions for damping the axial motion of the wiper shaft 18 can also be provided. FIG. 13 shows the version of FIG. 12, in which all the means 120, 122 and 128 are maximally stressed, and thus a maximum displacement distance of the wiper shaft 18 is attained. The means 120, 122, 128 are upset under the influence of the axial force 40. By comparison, the version of FIG. 14 shows a deformation element 162, which is stretched (FIG. 15) under the influence of the axial force 40. In FIG. 16, a deformation element 158 is shown, which is secured by one end to the vehicle body 24 via welded spots 144 and on its other end has a bottom 142 with a welded nut 140 that can be engaged by the screw 138. If a self-tapping screw is used as the screw 138, then it is expedient for a leadthrough 152 for the screw 138 to be integrally formed onto the bottom 142 of a deformation element 160 (FIG. 17).

FIG. 8 shows a version in which the bearing housing 126 is secured to the vehicle body 24 via a mounting bracket 130 with a motor mounting bracket 166, via a bracket 150 and props 164. The third means 128 are disposed between the bearing eyelets 136 and the props 164, while fourth means 132 are provided between the bracket 150 and the motor mounting bracket 166. The axes 156 of the means 128, 132 are expediently oriented essentially parallel to the axes 154 of the wiper shafts 18, so that the critical axial force 40 will be introduced optimally into the means 128, 132.

What is claimed is:

1. A wiper installation, comprising:
   at least one wiper bearing (10) having a bearing housing (12, 126), wherein a wiper shaft (18) having opposite ends is supported and axially fixed in said bearing housing, wherein one of said ends (20) of said wiper shaft protrudes from a vehicle body (24) and carries a wiper arm (60), wherein the wiper shaft (18) is displaceable into the vehicle body (24) when a critical axial force (40) that exceeds a predetermined magnitude determined by an injury risk of a person's body is exerted from outside on the one of said ends (20), wherein means (56, 88, 116, 120, 122, 128, 132) that are plastically deformable in an axial direction are provided at a location selected from the group consisting of between an inward-acting stop (54, 58, 84) of the wiper shaft (18) and the vehicle body (24) and between said inward-acting stop and a part (12, 130) solidly connected to said vehicle body (24), wherein the means are a plastically deformable sheet-metal sheath (56), wherein the sheet-metal sheath 56 has an axially corrugated region (90).

2. The wiper installation of claim 1, wherein a defined displacement distance (76) is specified for the wiper shaft (18), and a spacing selected from the group consisting of a spacing (78) of the wiper arm (60) from the vehicle body (24) and a spacing of the wiper arm (60) from the windshield (30), and a distance selected from the group consisting of a distance (80) of an inner end (22) of the wiper shaft (18) from an adjacent vehicle part (86) a distance of a part (74) solidly connected to said wiper shaft (18) from said adjacent vehicle part, corresponds at least to the displacement distance (76).

3. The wiper installation of claim 1, wherein a motion of the wiper shaft (18) is damped to an increased extent toward the end of the displacement distance (76).

4. The wiper installation of claim 1, wherein the sheet-metal sheath (56) is disposed such that in a crash, it is upset under the influence of the critical axial force (40).

5. The wiper installation of claim 1, wherein the sheet-metal sheath (56) is disposed such that in a crash, it is pulled apart (15) under the influence of the critical force (40).

6. The wiper installation of claim 1, wherein the means (56, 114, 122), upon deformation, press against an adjacent wall (12, 18, 148) and damp the motion of the wiper shaft (18) by friction with the wall.

7. The wiper installation of claim 1, wherein the stop of the wiper shaft (18) is formed by an intermediate ring (84), wherein said intermediate ring (84) serves as a bearing face for a fastening part (60) of a wiper arm.

8. The wiper installation of claim 1, wherein the inward-acting stop (104) of the wiper shaft (18) has positive engagement means with a rated breaking point (106, 110, 112, 114, 118).

9. The wiper installation of claim 1, wherein the bearing housing (126) is supported on an element selected from the group consisting of the vehicle body (24) and a mounting bracket (130) of the wiper installation by means selected from the group consisting of plastically deformable and nonpositive engagement means (128).

10. The wiper installation of claim 9, wherein a mounting bracket (130) of the wiper installation is supported on the vehicle body (24) by fourth plastically deformable or nonpositive engagement means (132).

11. The wiper installation of claim 1, wherein a fastening part (60) of the wiper arm has a large-area cover cap (66) of solid material in a region where said fastening part is fastened to the wiper shaft (18).

* * * * *